Aug. 3, 1965          P. W. NIPPERT          3,199,000
MOUNT FOR SEMICONDUCTORS
Filed July 11, 1960          8 Sheets-Sheet 1
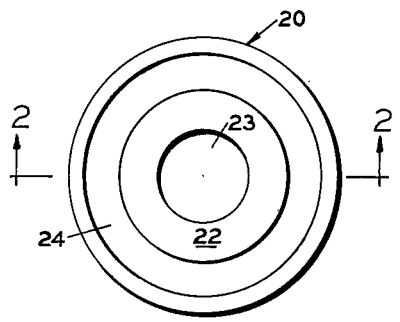
FIG. 1
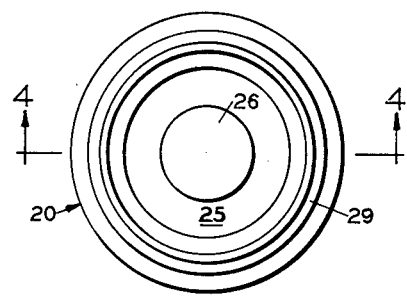
FIG. 3
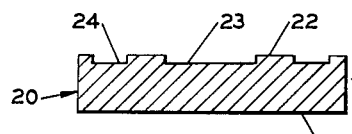
FIG. 2
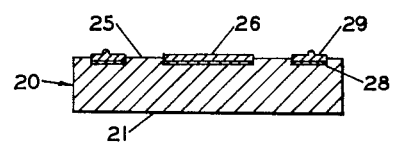
FIG. 4
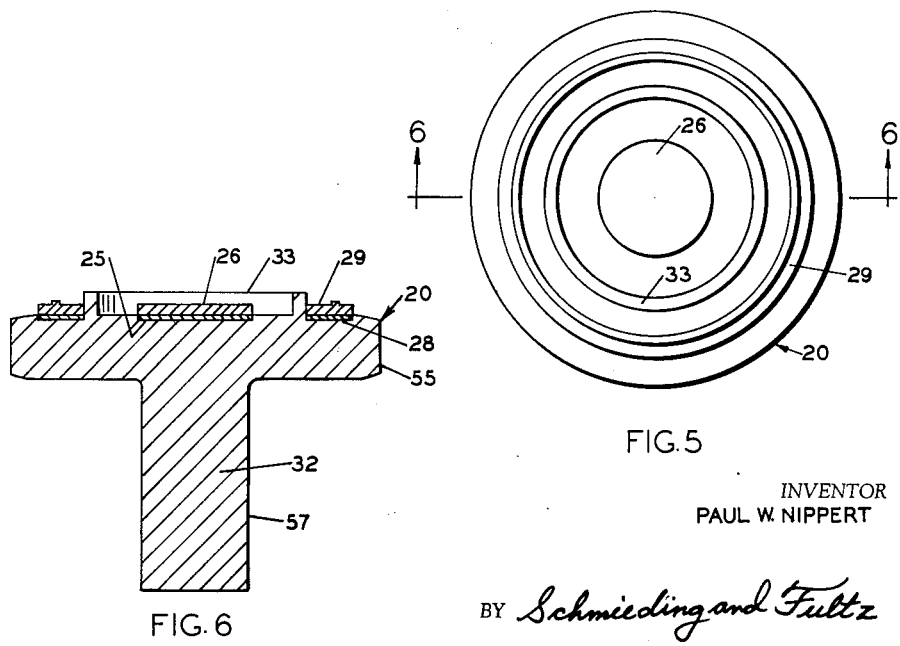
FIG. 5
FIG. 6
INVENTOR
PAUL W. NIPPERT
BY *Schmieding and Fultz*
ATTORNEYS Aug. 3, 1965  P. W. NIPPERT  3,199,000
MOUNT FOR SEMICONDUCTORS
Filed July 11, 1960  8 Sheets-Sheet 2
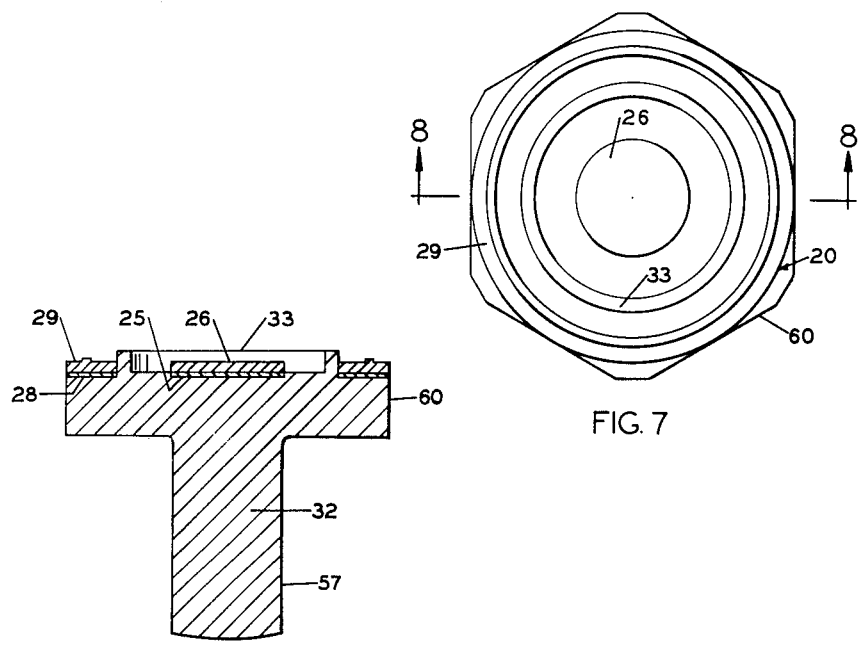
FIG. 7
FIG. 8
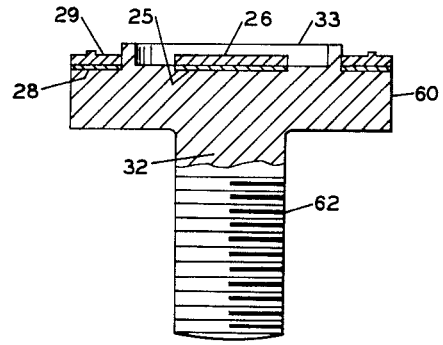
FIG. 9
*INVENTOR*
PAUL W. NIPPERT
BY *Schmieding and Fultz*
ATTORNEYS

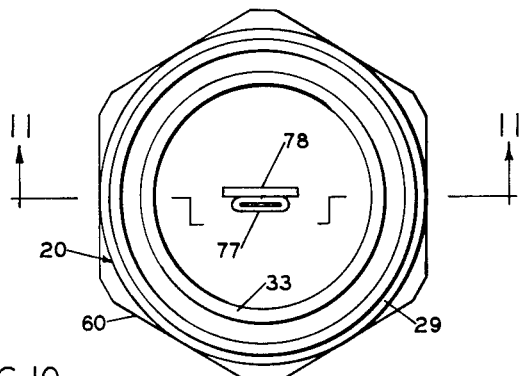
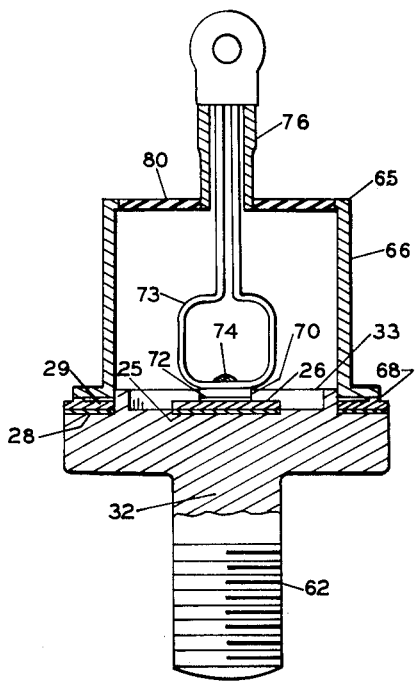
FIG. 10
FIG. 11
INVENTOR
PAUL W. NIPPERT

Aug. 3, 1965  P. W. NIPPERT  3,199,000
MOUNT FOR SEMICONDUCTORS

Filed July 11, 1960  8 Sheets-Sheet 4

INVENTOR
PAUL W. NIPPERT

BY *Schmieding and Fultz*

ATTORNEYS

Aug. 3, 1965       P. W. NIPPERT       3,199,000
MOUNT FOR SEMICONDUCTORS
Filed July 11, 1960                 8 Sheets-Sheet 6

*INVENTOR.*
PAUL W. NIPPERT
BY
*Schmieding and Fultz*
ATTORNEYS

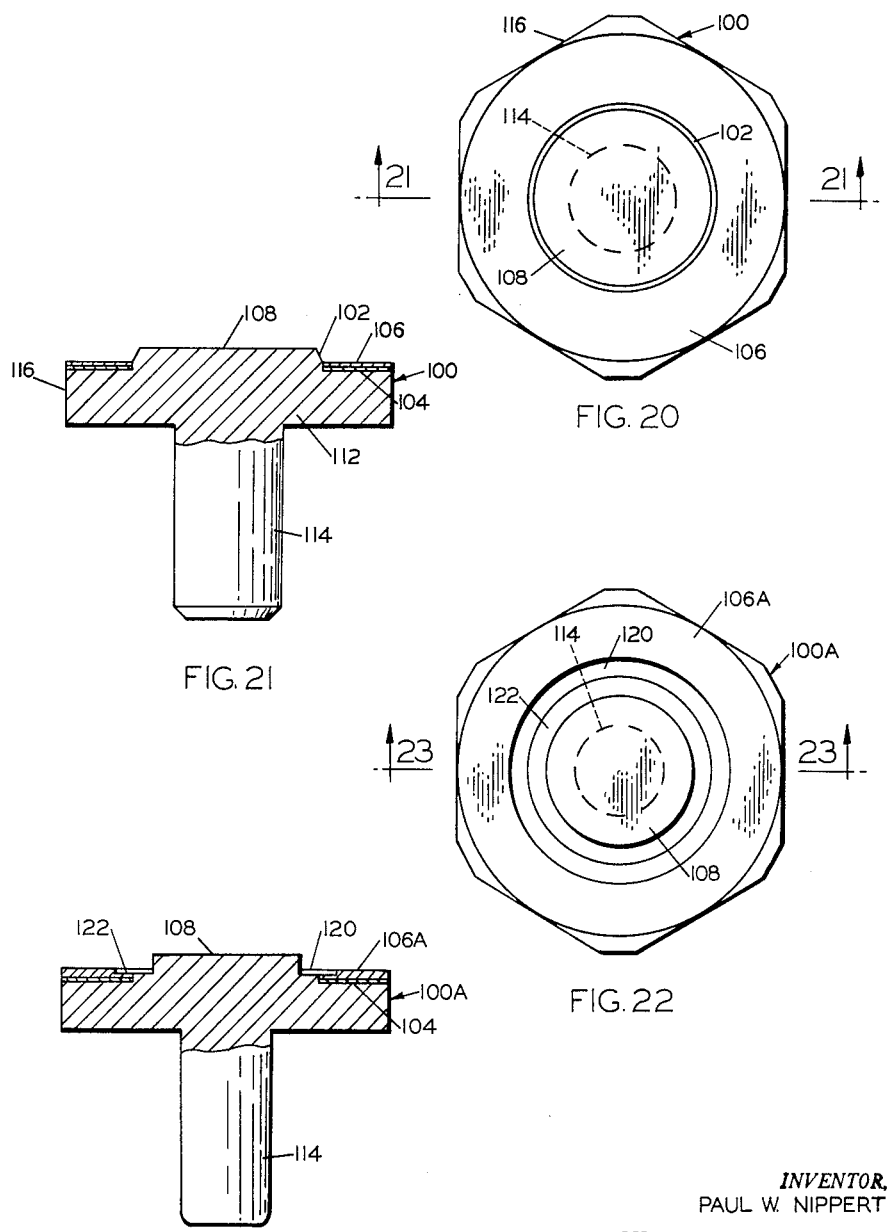

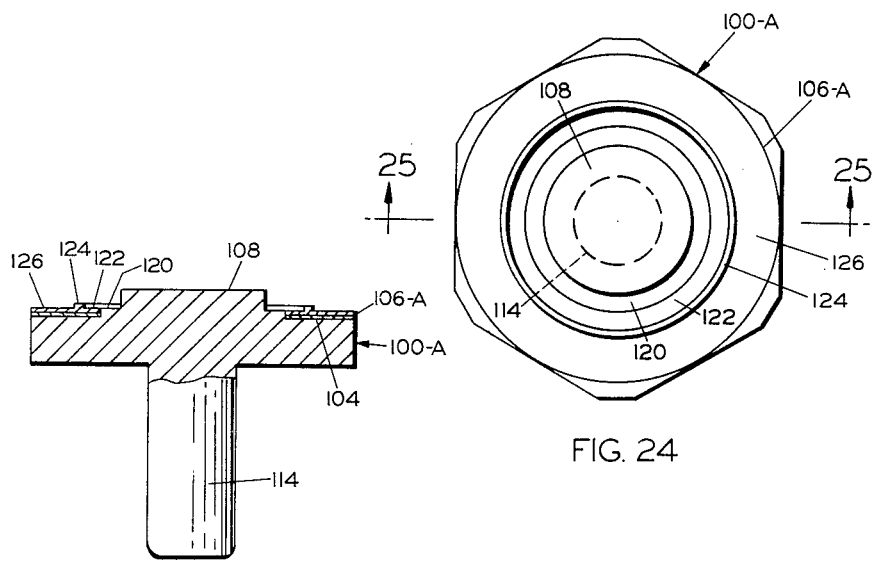
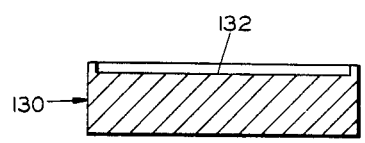
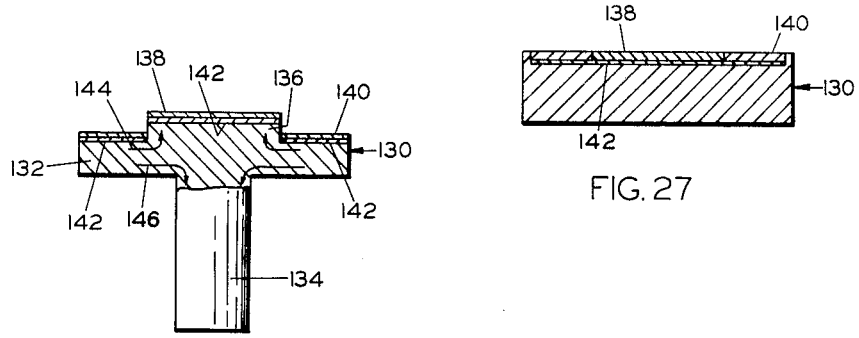

United States Patent Office 3,199,000
Patented Aug. 3, 1965

3,199,000
MOUNT FOR SEMICONDUCTORS
Paul W. Nippert, Worthington, Ohio, assignor to The Nippert Electric Products Company, Columbus, Ohio, a corporation of Ohio
Filed July 11, 1960, Ser. No. 43,699
13 Claims. (Cl. 317—234)

This application is a continuation-in-part of co-pending application Serial No. 813,552 filed May 15, 1959, now abandoned.

This invention relates to solid state semiconductors and methods of making same.

More specifically, the present invention relates to a novel mounting means for supporting solid state semiconductors. Mounting means of this general type comprise a main mount portion including a platform provided with an upper surface for supporting a semiconductor and a downwardly extending stem that is generally threaded so that the assembly can be attached to a heat sink panel by screwing the stem into a threaded hole.

In forming semiconductor mounts of this type it is the general practice in the art to machine the main mount portion from copper, including the platform and stem, and to silver-braze a thin disk, of molybdenum or other suitable metal, to the upper surface of the platform. A semiconductor, formed of germanium, silicon, or other suitable material, is next soft-soldered directly to the molybdenum. The purpose of the molybdenum disk is to provide a conductive interlayer between the semiconductor and copper mount portion that has substantially the same coefficient of thermal expansion as the semiconductor so that the soldered junction between the semiconductor and the underlying supporting surface will not become fractured by thermally imposed expansion and contraction during use of the finished semiconductor.

It has also been the practice in the art to silver-braze a weld ring, of nickel-plated steel or other suitable metal, to the top surface of the copper mount portion, in surrounding relationship with the semiconductor. The function of such weld ring is to provide a steel surface to which a cover portion can be subsequently attached by flash welding.

In the course of silver-brazing the above described molybdenum disk and steel weld ring to the main mount portion, it is, of course, necessary to heat the main mount portion to about 1150 degrees Fahrenheit or above which mount portion, if not previously annealed, becomes annealed during the heating operation with the result that the mount portion is necessarily soft and hence lacks strength.

In accordance with one aspect of the present invention, an improved semiconductor mount of the type described is formed by a novel method wherein the main mount portion is die cut from sheet copper to first form a disk-shaped workpiece. The upper surface of the copper workpiece is provided with a central recess for receiving and locating the previously mentioned molybdenum disk and an annular recess for receiving and locating the previously mentioned steel weld ring. The molybdenum disk and weld ring are next silver-brazed to the copper workpiece which workpiece, if not previously annealed, becomes annealed under the application of heat during the silver-brazing operation. It will be understood that the assembly, at this stage of the process, includes an annealed copper workpiece that lacks strength as compared to work-hardened copper.

The assembly, including the workpiece, molybdenum disk to which the semiconductor is subsequently attached, and the steel weld ring to which the cover portion is subsequently attached, is next subjected to pressure in a confining die whereby the metal in the copper workpiece is caused to flow and form a stem portion extending downwardly from a platform portion. This causes the previously annealed copper to assume the shape of the main mount portion and become work-hardened to full hard copper with a resulting high increase in strength.

If desired, when the main copper mount portion is being shaped by subjecting the workpiece to pressure in the confining die, the metal may also be caused to form an integral upwardly extending annular flange in surrounding relationship with the transistor element inwardly of the steel weld ring to provide a splash shield, that protects the semiconductor from molten splashes of welding material when a cup-shaped cover portion is subsequently flash welded to the previously mentioned weld ring to provide a cover for the semiconductor.

It will therefore be understood that in practicing the method of the present invention, the molybdenum disk, to which the semiconductor is subsequently secured, and the steel weld ring, for subsequently mounting a cover portion, are heat fused to the copper workpiece prior to actually pressure forming the workpiece to the shape required for the finished main mount. Hence all heating and therefore all annealing of the copper occurs prior to the pressure forming operation whereby the main mount portion ends up formed in a work-hardened state. This results in a finished semiconductor mount assembly that includes not only a thermally fused molybdenum disk and steel weld ring but also a mount portion formed of full hard copper that possesses high strength.

In accordance with another aspect of the present invention a modified semiconductor mount is formed from a disk-shaped workpiece that includes a raised central portion on one side thereof. An annular weld ring and underlying layer of silver-brazed material are positioned on the workpiece with the central raised portion serving merely to locate the weld ring and underlying brazing material. The assembly is next heated to fuse the weld ring to the copper workpiece and the fused assembly is next subjected to pressure in a confining die to cause a first flow of metal that forms a downwardly extending stem and a second flow of metal that forms an upwardly extending platform on which the semiconductor is subsequently mounted.

If desired, the method just described can be modified to provide an upstanding annular flange on the weld ring by the application of pressure to the inner portion of the weld ring and by the subsequent machining away of metal from the upper outer portion of the weld ring.

As still another aspect of the present invention a novel modified semiconductor mount is formed from a copper blank having an upstanding peripheral flange on one side thereof. An annular disk of silver-brazing material is next positioned on the blank with the upstanding peripheral flange serving as locating means. A central disk of molybdenum and a surrounding annular weld ring are next positioned over the disk of brazing material. After the assembly is thermally fused it is subjected to pressure in a suitable confining die to cause a first flow of metal to form a downwardly extending stem and a second flow of metal that forms an upwardly extending platform that carries the previously mentioned molybdenum disk and it is surrounded by the previously mentioned weld ring.

Further objects and advantages of the present invention will be apparent from the following description, reference being had to the accompanying drawings wherein preferred forms of embodiments of the invention are clearly shown.

In the drawings:

FIG. 1 is a top elevational view of the workpiece formed in accordance with the method of the present invention;

FIG. 2 is a side sectional view of the workpiece of FIG. 1, the section being taken along line 2—2 of FIG. 1;

FIG. 3 is a top elevational view showing the workpiece of the present invention of the preceding figures showing a transistor supporting element for a semiconductor and a weld ring attached thereto;

FIG. 4 is a side sectional view of the workpiece of FIG. 3, the section being taken along the line 4—4 of FIG. 3;

FIG. 5 is a top elevational view of the workpiece of the preceding figures illustrating said workpiece after it has been subjected to pressure in a confining die;

FIG. 6 is a side sectional view corresponding to FIG. 5, the section being taken along the line 6—6 of FIG. 5;

FIG. 7 is a top elevational view of the workpiece of the preceding figures illustrating said workpiece after a plurality of plane sides have been formed thereon;

FIG. 8 is a side sectional view corresponding to FIG. 7, the section being taken along the line 8—8 of FIG. 7;

FIG. 9 is a side sectional view showing the workpiece of the preceding figures after threads have been formed on a stem portion thereof, the section being taken along a vertical plane through the center line of said workpiece;

FIG. 10 is a top elevational view of an assembled semiconductor and mount formed in accordance with the present invention;

FIG. 11 is a side sectional view of the semiconductor and mount of FIG. 10, the section being taken along the line 11—11 of FIG. 10;

FIGS. 14–21 illustrate the steps in the method of forming a modified semiconductor mount in accordance with the present invention;

FIGS. 22–24 illustrate steps and method that modify the method illustrated in FIGS. 14–21;

FIGS. 26–28 illustrate steps in still another method for forming a semiconductor mount constructed in accordance with the present invention.

Figure 12:
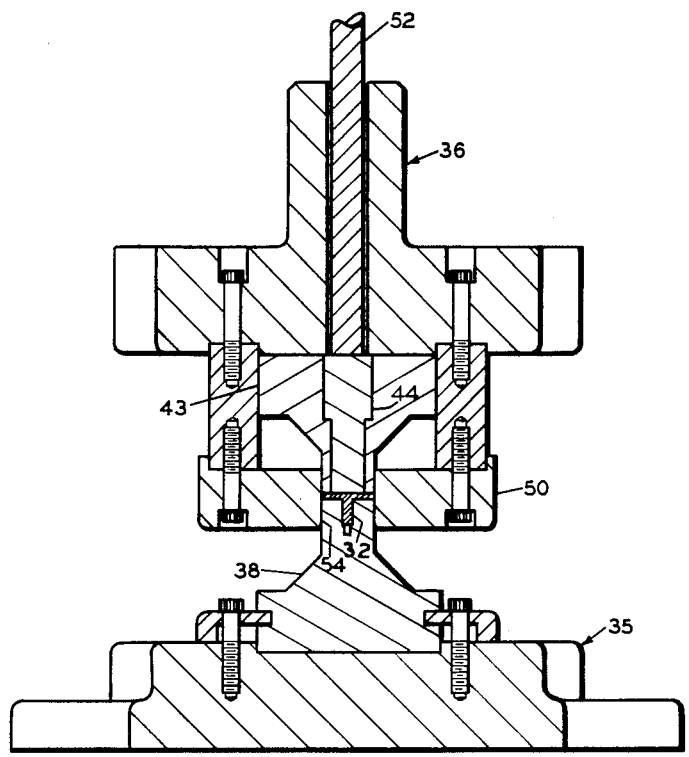
FIG. 12 is a side sectional view of a die apparatus for use in practicing the method of the present invention, the section being taken along a vertical plane through the center line of the die apparatus.

Referring in detail to the drawings, FIGS. 1 through 9 illustrate the various steps in the method of forming a semiconductor mount in accordance with the present invention.

Although the present specification describes transistor mounts and methods of making same it will be understood that other semiconductors such as rectifiers and diodes can be produced in accordance with the present invention without departing from the spirit thereof.

As seen in FIGS. 1 and 2, a metal blank indicated generally at 20 is die cut from flat sheet metal stock of copper or other suitable metal. The workpiece includes a lower surface 21 and an upper surface 2, the latter being provided with a central recess 23 and an annular recess 24 formed by applying pressure to said upper surface 22 with a coining die. It is preferable to coin central recess 23 and annular recess 24 simultaneously with and by the same die used in blanking the workpiece from the sheet copper.

Referring next to FIGS. 3 and 4, a disk 25 of silver-solder is positioned in the bottom of central recess 23 and a molybdenum disk 26 is positioned on top of silver-solder disk 25, the outer edges of said molybdenum disk being engaged by the sides of recess 23.

With continued reference to FIGS. 3 and 4, an annular disk 28 of silver-solder is disposed in annular recess 24 and a weld ring 29, preferably formed of nickel-plated steel, is positioned over silver-solder disk 28 to the side edges of annular recess 24 confronting the side edges of weld ring 29.

The assembly of FIGS. 3 and 4 is next heated to fuse silver-solder disks 25 and 28 and thereby secure molybdenum disk 26 and weld ring 29 to workpiece 20.

Figure 13:
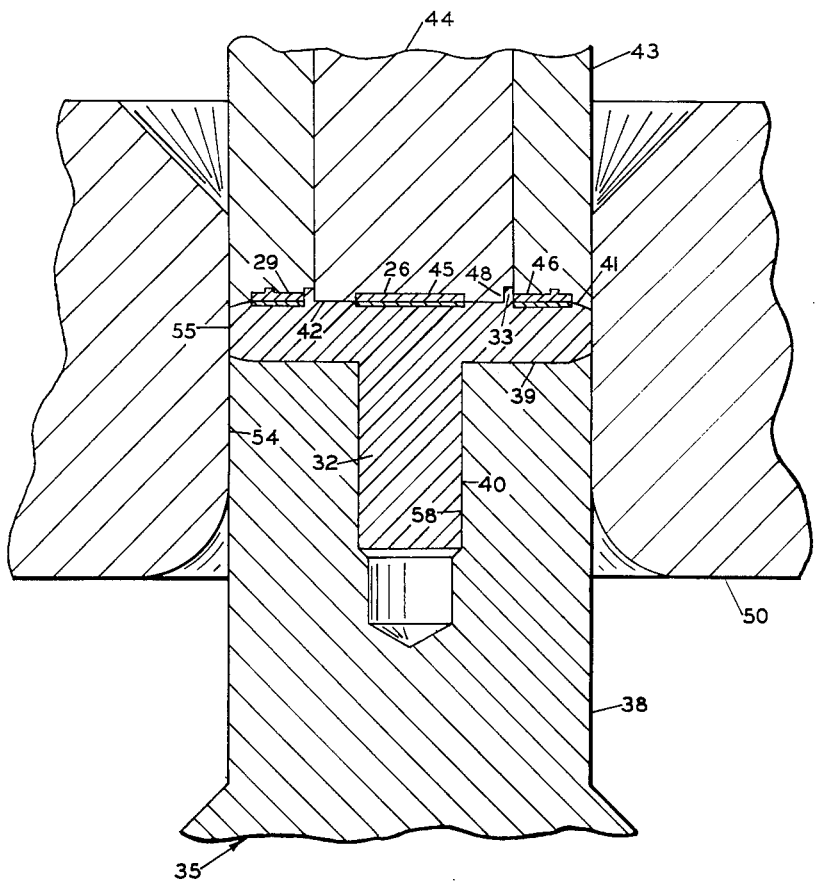
FIG. 13 is a side sectional view showing a portion of the die apparatus of FIG. 12 in enlarged detail.

After the silver-solder operation, the composite workpiece of FIGS. 3 and 4 is placed in the die apparatus of FIGS. 12 and 13 and subjected to pressure to cause the metal in workpiece 20 to flow and assume the shape shown in FIGS. 5 and 6. The confining die is so shaped to cause the metal in the lower portion of the workpiece to extrude downwardly and form a stem portion 32 and the metal in the upper portion of the workpiece to extrude upwardly and form an annular flange 33.

Referring next to FIGS. 12 and 13, the die apparatus includes a stationary base portion 35 for attachment to the bed of a hydraulic press and movable portion 36 for attachment to the ram of said press.

As best seen in FIG. 13, base portion 35 includes a block 38 that forms a pressure applying surface 39 and a recess 40. Upper pressure applying surfaces 41 and 42 are formed by an annular die element 43 and a rod shaped die element 44. Surface 42 includes a recess 45 for receiving and maintaining the location of molybdenum disk 26. Similarly, surface 41 includes a recess 46 for receiving and maintaining the location of weld ring 29. The die portions 43 and 44 also form an annular recess 48 for receiving an upward flow of metal that forms annular flange 33 during the pressure applying operation.

In operation of the die apparatus of FIGS. 12 and 13, the composite workpiece of FIGS. 3 and 4 is placed in the die apparatus with the lower surface 21 resting on the upper surface 39 of block 38. Movable die portion 36 is moved downwardly whereby confining ring 50 moves into surrounding relationship with workpiece 20. As the die continues downwardly, recess 46 surrounds weld ring 29 and recess 45 surrounds molybdenum disk 26. As movable die portion 36 continues downwardly, pressure is exerted on the top surface of the workpiece by pressure applying surfaces 41 and 42 and to the lower surface of the workpiece by pressure applying surface 39. This causes the metal in the lower portion of the blank to extrude downwardly into recess 40 and form a stem portion 32. In addition, metal flows upwardly into annular recess 48 and forms annular flange 33.

After the assembly is shaped as seen in FIGS. 5, 6, 12, and 13, movable die portion 36 including central ejector rod 52 are moved upwardly. Since the surface area of frictional engagement between an inner surface 54 of confining ring 50 and an edge surface 55 of the workpiece is greater than the frictional engagement between an outer surface 57 of stem 32 and an inner surface 58 of recess 40, the workpiece will move upward with movable die portion 36 whereby stem 32 is extracted from recess 40. The upward movement of ejector rod 52 is next arrested while movable die portion 36 including confining ring 50 continue to move upwardly. This causes confining ring 50 to be stripped off of the workpiece as it moves upwardly relative to die elements 43 and 44, said latter two elements being maintained stationary by ejector rod 52.

As seen in FIGS. 7 and 8, the outer edge 55 of the workpiece 20 is next shaved or punched to form a plurality of plane surfaces 60 to provide means for attaching a wrench thereto.

Stem 32 of the workpiece is next threaded as seen at 62 in FIG. 9.

Reference is next made to FIGS. 10 and 11 which illustrate an assembled transistor element comprising the previously described transistor mount to which has been applied a cover indicated generally at 65. The cover includes an inverted metallic cup member 66, the lower edge of which is secured to weld ring 29 by a flash weld 68. The flash welding operation is of such short time duration that the mount portion is not sufficiently heated to destroy the work-hardening previously applied to the workpiece by cold flowing the metal in the die apparatus.

It will now be understood that annular flange 33 functions as a splash guard to protect a transistor element 70 from being splashed by articles of molten metal during the flash welding operation.

Transistor element 70, formed of germanium, silicon, or other suitable material, is secured to molybdenum disk 26 by soft-solder 72. A braided wire terminal 72 is soft-soldered to the top surface of transistor element 70 at a solder junction 74, said wire being extended upwardly through a metallic tube 76, the upper end of said tube being flattened at 77. A clip 78, for connecting a lead wire, is soldered to a side of flattened portion 77 of tube 76, the latter being insulated from metallic cup member 66 by a dielectric ring 80.

Figure 14:
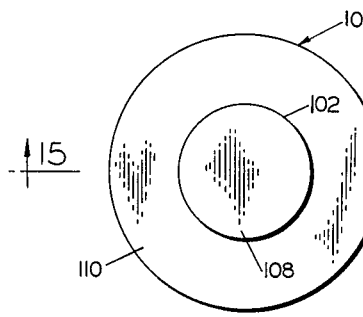
Figure 15:
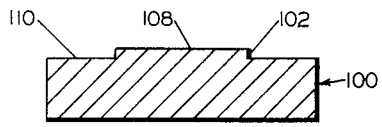

Reference is next made to FIGS. 14-21 which illustrate a modified transistor mount and method of producing same. FIGS. 14 and 15 illustrate a blank 100 which is stamped and pressed from copper sheet stock to provide a raised central portion 102, central surface 108, and annular surface 110.

Figure 16:
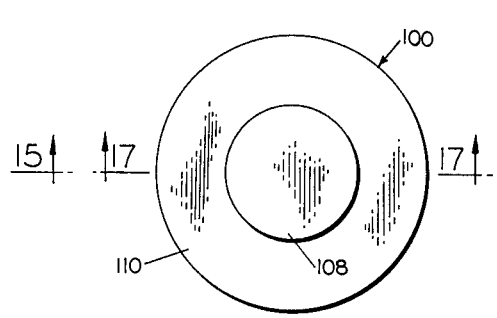
Figure 17:
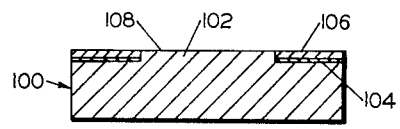

As seen in FIGS. 16 and 17 disk 104 of silver-brazing material and a steel weld ring 106 are located on the blank by raised central portion 102. The assembly is heated to a temperature above the fusing point of the silver-brazing material 104 that is to keep the temperature between 1180 and 1600 degrees Fahrenheit.

The assembly is next subjected to pressure in a suitable confining die whereby the inner edge of steel weld ring 106 is depressed downwardly and at the same time a first flow of metal extends central portion 102 upwardly relative to weld ring 106 and a second flow of metal displaces metal from platform portion 112 inwardly and downwardly to form stem 114.

Figures 18, 19:
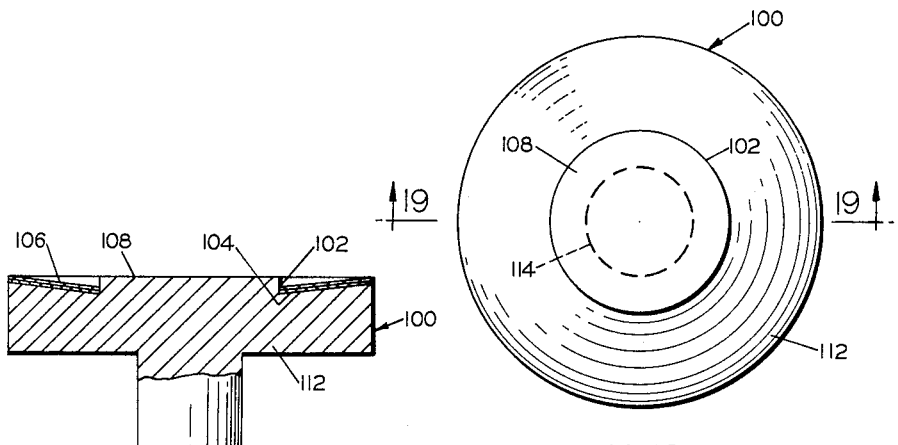

With reference to FIGS. 20 and 21 the blank in the configuration of FIG. 19 is subjected to pressure in a second confining die whereby the outer edge of weld ring 106 is pressed downwardly and metal is caused to flow inwardly to raise central portion 102 and taper its sides inwardly as seen in FIG. 21. The second pressure applying step also forms flat sides 116 which provide mean for gripping the mount with a wrench.

Reference is next made to FIGS. 22 and 23 which show a modified transistor mount which is formed by the same steps previously described in connection with the mount of FIGS. 14-21 except that during the second pressure application in the confining die a recess 120 is formed by depressing the inner upper side of weld ring 106A to cause it to assume the configuration illustrated in FIGS. 22 and 23.

With reference to FIGS. 24 and 25 at the upper outer portion of weld ring 160A is next machined away at 126 to form an annular protusion 124 that serves as a weld ring for the subsequent attachment of a cover of the type illustrated in FIG. 11.

Reference is next made to FIGS. 26-28 which show still another modified semiconductor mount and method for making same.

A disk-shaped workpiece 130 is provided with a central recess 132 for locating a thin disk of silver-brazing material, an underlying molybdenum disk 138, and an annular weld ring 140. The assembly is next thermally fused and then subjected to pressure in a suitable confining die to cause a first flow of metal that forms an upwardly extending central platform 136 and a second flow of metal that forms a downwardly extending stem portion 134.

With reference to FIG. 28, arrows 144 illustrate generally the path of the first flow of metal and the arrows 146 illustrate generally the path of the second flow of metal. These flows serve to workharden the metal at the junction of stem 134 and platform 132, and also at the junction of raised central portion 136 and platform 132.

In view of the above it will be understood that the methods of the present invention produce radially inwardly directed flows of metal in the platform portions such as platform portion 132 in FIGURE 28. This greatly augments the strength of the mounts so far as resisting stresses applied to the platform in directions transversely of the grain structure formed by the radially inwardly directed flows of metal. This is important since the bottom surfaces on the platforms and the top surfaces on the heat sinks are never perfectly plane whereby stresses are applied to the platforms when the mounts are tightened down in the holes in the heat sinks.

Another important improvement results from the work-hardening of stem portions such that threads that are subsequently formed thereon possess high strength and are not easily stripped when the mounts are tightened down in their mounting holes in the heat sink. Tests have shown that mounts formed in accordance with the present invention can be subjected to as much as 180 inch pounds of torque prior to stripping of the threads from the stem portions whereas mounts of the same size that were formed by prior methods failed due to stripping of stem threads at torque values at low as 30 inch pounds.

While the forms of embodiments of the present invention as herein disclosed constitute preferred forms, it is to be understood that other forms might be adopted, all coming within the scope of the claims which follow:

I claim:

1. In combination, a work-hardened metal piece including an upper surface and an integral stem extending from a lower surface; a metal element brazed to said upper surface; a solid state semiconductor thermally fused to the upper surface of said element, the coefficient of expansion of said metal element being substantially similar to the coefficient of expansion of said solid state semiconductor.

2. In combination, a work-hardened metal piece including an integral flange extending from the upper surface and an integral stem extending from a lower surface; and a metal element brazed to said upper surface and surrounded by said flange; a solid state semiconductor thermally fused to the upper surface of said element, the coefficient of expansion of said metal element being substantially similar to the coefficient of expansion of said solid state semiconductor.

3. In combination, a work-hardened metal piece including a plurality of plane side surfaces, an upper surface and an integral stem extending from a lower surface; and a metal element brazed to said upper surface; a solid state semiconductor thermally fused to the upper surface of said element, the coefficient of expansion of said metal element being substantially similar to the coefficient of expansion of said solid state semiconductor.

4. In combination, a work-hardened metal piece including an upper surface and an integral stem extending from a lower surface; a first metal element brazed to said upper surface; a solid state semiconductor thermally fused to the upper surface of said element, the coefficient of expansion of said first metal element being substantially similar to the coefficient of expansion of said semiconductor; and a second metal element brazed to said upper surface in spaced surrounding relationship with said first metal element.

5. In combination, a work-hardened metal piece including an upper integral flange extending from an upper surface and an integral stem extending from a lower surface; a first metal element brazed to said upper surface and surrounded by said flange; a solid state semiconductor thermally fused to the upper surface of said element, the coefficient of expansion of said first metal element being substantially similar to the coefficient of expansion of said semiconductor; and a second metal element brazed to said upper surface in spaced surrounding relationship with said first metal element.

6. In combination, a work-hardened metal platform including a plurality of plane side surfaces, an upper surface and an integral stem extending from a lower surface; a first metal element brazed to said upper surface; a solid state semiconductor thermally fused to the upper surface of said element, the coefficient of expansion of said first metal element being substantially similar to the coefficient of expansion of said semiconductor; and a second metal element brazed to said upper surface in spaced relationship with said first metal element.

7. In combination:
 (A) An integral work-hardened metal piece, such as copper, said piece having:
   (1) a top side, part of the top side being elevated,
   (2) a stem extending downwardly from said piece, said stem being disposed opposite the area occupied by the elevated part,
   (3) a bottom surface surrounding the stem at the root thereof;
 (B) a metal element;
 (C) and means brazing the metal element to the said metal piece.

8. A combination as defined in claim 7, in which the metal element is brazed to the top of the metal piece.

9. A combination as defined in claim 7, in which the metal element is brazed to the top side of the elevated part of the metal piece.

10. A combination as defined in claim 7, in which the metal element is brazed to the area of the top side which is below the top part of the metal piece.

11. A combination as defined in claim 7, in which the top side of the metal piece includes a surface surrounding the elevated part and said metal element is brazed to the last mentioned surface.

12. A combination as defined in claim 8, including:
 (D) A solid state conductor, the coefficient of expansion of said conductor and said metal element being substantially the same;
 (E) and means for fixing the conductor to the metal element, said means having the characteristic for fixing at a temperature below the annealing temperature of said work-hardened metal piece.

13. A combination as defined in claim 8, including:
 (D) a second metal element brazed to the top surface which surrounds the elevated part;
 (E) a solid state conductor, the coefficient of expansion of said conductor and said metal element being substantially the same; and
 (F) means for fixing the conductor to the metal element, said means having the characteristic for fixing at a temperature below the annealing temperature of said work-hardened metal piece.

References Cited by the Examiner
UNITED STATES PATENTS

| | | | |
|---|---|---|---|
| 2,320,993 | 6/43 | Worner | 29—480 |
| 2,471,663 | 5/49 | Tietz | 29—480 |
| 2,473,371 | 6/49 | Heath | 29—155.55 |
| 2,549,424 | 4/51 | Carlson et al. | 317—242 X |
| 2,667,526 | 1/54 | Stumbock | 29—498 X |
| 2,707,252 | 4/55 | Peter et al. | 317—234 |
| 2,726,357 | 12/55 | Sachs | 317—234 |
| 2,739,369 | 3/56 | Cooney | 29—155.55 |
| 2,754,393 | 7/56 | Clair | 29—155.55 |
| 2,817,797 | 12/57 | Coyle | 317—234 |
| 2,834,102 | 5/58 | Pflumm et al. | 29—497 X |
| 2,864,980 | 12/58 | Mueller et al. | 317—234 |
| 2,964,830 | 12/60 | Henkels et al. | 317—234 |

DAVID J. GALVIN, *Primary Examiner.*

WHITMORE A. WILTZ, NEDWIN BERGER, JAMES D. KALLAM, *Examiners.*